R. B. HARTMAN.
REINFORCED CONCRETE CONSTRUCTION.
APPLICATION FILED JULY 5, 1918.

1,379,625. Patented May 31, 1921.
4 SHEETS—SHEET 2

Inventor
Rudolph B. Hartman

Witnesses
Edwin F. McKee

By
Eugene C. Brown
Attorney

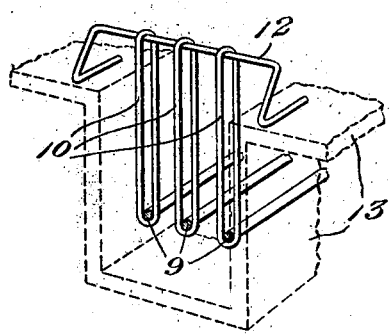
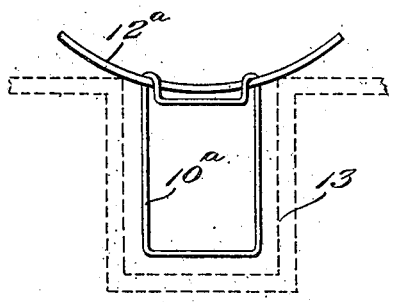
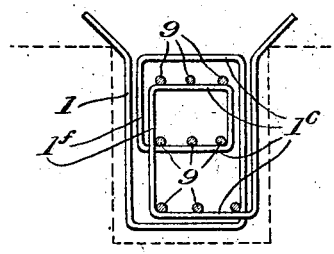
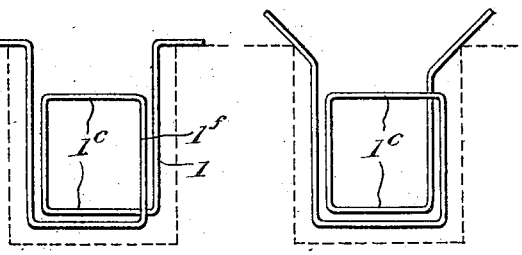
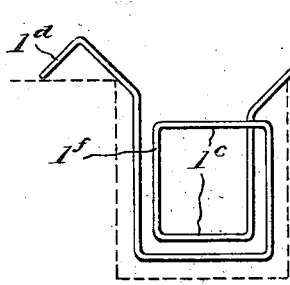
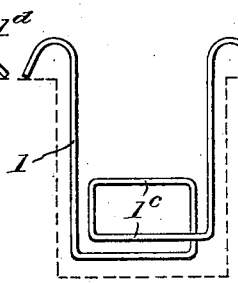
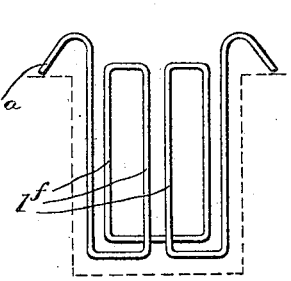

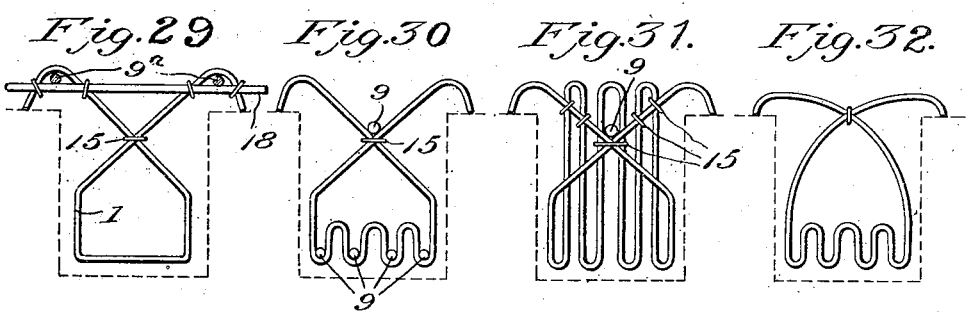

UNITED STATES PATENT OFFICE.

RUDOLPH B. HARTMAN, OF MILWAUKEE, WISCONSIN.

REINFORCED CONCRETE CONSTRUCTION.

1,379,625.  Specification of Letters Patent.  Patented May 31, 1921.

Application filed July 5, 1918. Serial No. 243,462.

*To all whom it may concern:*

Be it known that I, RUDOLPH B. HARTMAN, a citizen of the United States, residing at Milwaukee, in the county of Milwaukee and State of Wisconsin, have invented certain new and useful Improvements in Reinforced Concrete Constructions, of which the following is a specification.

My invention relates to structural concrete construction and more particularly to the reinforcement of concrete floors and beams.

In concrete girder construction it is customary to combine with the body of concrete, a series of longitudinal rods or bars, and a number of vertical metal members to strengthen and reinforce the concrete. As well understood by engineers, the best results in reinforced concrete floors and girders are obtained when the tensile properties of the steel and the compressive properties only of the concrete are utilized to the fullest extent. It is necessary, therefore, that the reinforcing rods and bars shall be properly positioned and spaced within the body of the concrete. Great difficulty has been experienced in the construction of reinforced floors and girders in supporting the reinforcing-bars in correct positions while the concrete is being poured.

One of the objects of my invention is to provide a series of stirrups or braces for supporting the bars and properly spacing them, and which shall also serve to reinforce the concrete construction against shear and form a bond between the floor slab and the beams or girders.

Figure 1:
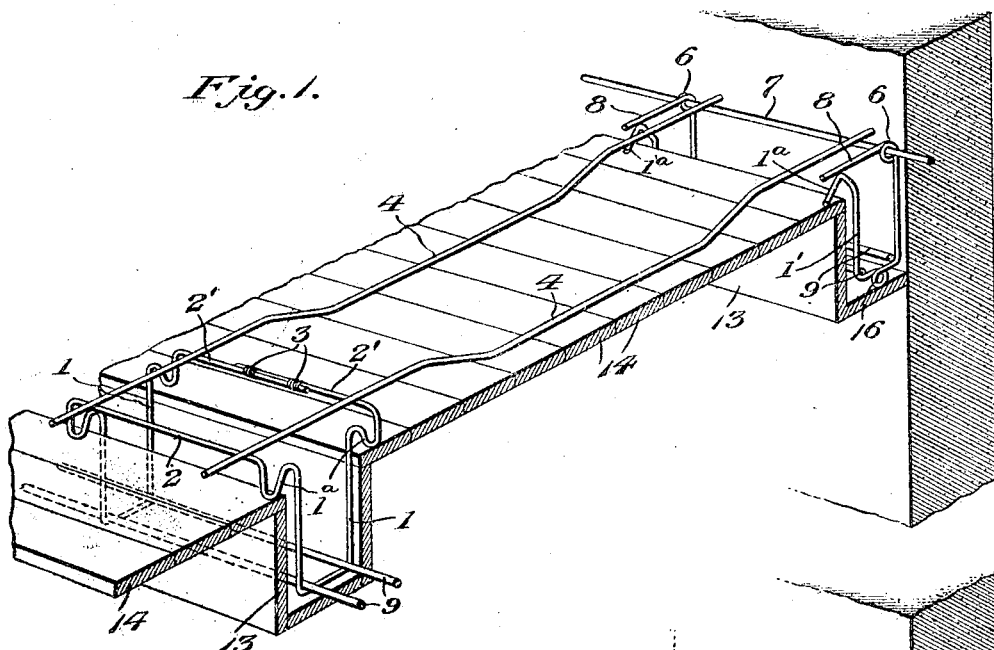
Figure 2:
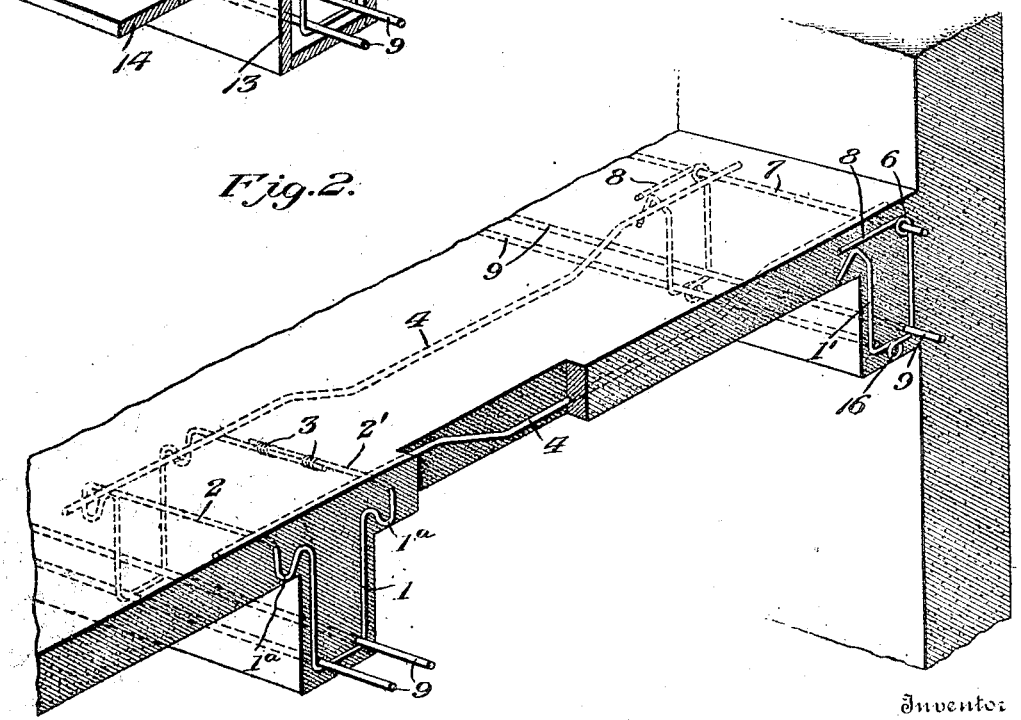
Figure 3:
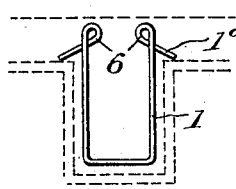
Figure 4:
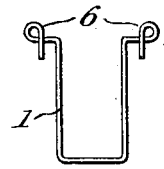
Figure 5:
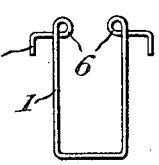
Figure 7:
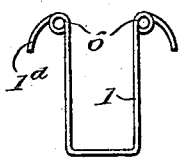
Figure 8:
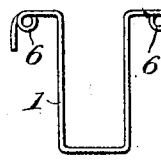
Figure 9:
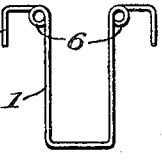
Figure 11:
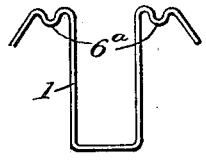
Figure 12:
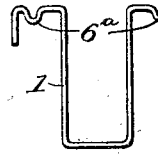
Figure 13:
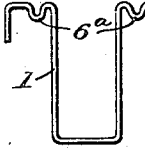
Figure 15:
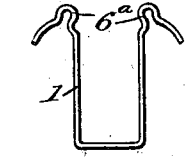
Figure 16:
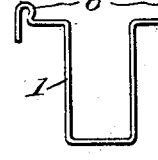
Figure 17:
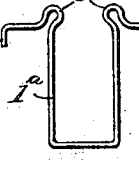

In the accompanying drawings, Figure 1 is a perspective view showing the manner of using my stirrups to support the reinforcing rods in the floor and beam forms preparatory to pouring the concrete; Fig. 2 is a perspective view illustrating the same after the concrete has been poured and the mold forms have been removed; Figs. 3 to 32, show various forms of my stirrups.

In Fig. 1, I have indicated the mold forms 13, to receive the concrete for the girders and beams and the intermediate mold boards 14, upon which the concrete floor slabs are poured, and in Fig. 2, I have indicated the concrete floor and beams, with the mold forms removed. The reinforcing bars 9, are supported within the mold forms for the beams by stirrups 1, in the manner disclosed in my said prior applications. In my present invention I form two or more stirrups from an integral bar, if desired. After one stirrup is formed with its supporting arms $1^a$, the bar is continued through the intermediate portion 2, and then formed into a second stirrup. The free ends 2', may be brought together and the lapped joint secured by wire wrappings 3, or in any other suitable manner. If desired, the bar might be continued into a third stirrup or even more, but I have found that it is sufficient to form them in pairs as shown. The connecting parts 2, 2', constitute supports maintained above the floor mold-boards by the arms $1^a$, to support the ends of cantaliver reinforcing slab rods 4, extending through the floor slabs between adjacent beams.

Figure 19:
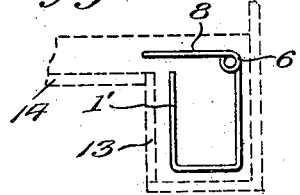
Figure 20:
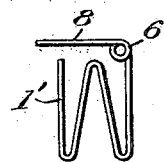

In my prior applications Serial Number 288,068, filed November 18, 1905, and Serial Number 369,765, now Patent 1,240,137, I disclosed a stirrup for supporting the reinforcing rods in which the stirrup is supported from the top by laterally diverging arms adapted to bear on the molds and also the forms shown in Figs. 19 and 20, which are provided with loops or eyes to receive the rods 7, forming the supports for the ends of the cantaliver bars 4. The constructions of Figs. 19 and 20 were previously disclosed in my said prior application in which I stated that this construction is more particularly adapted to beams on the ends of floors and the like, and further explained that a series of such stirrups could be connected by a rod passing through the eyes 6, and that the sides 1' may also be provided with supporting projections, as shown at $1^a$ in Fig. 1. Instead of forming completely closed eyes I may form the supporting members with open eyes or loops $6^a$ as illustrated in Figs. 11 to 18 inclusive, which will support the rods 7 for the same purpose.

In Fig. 21 I have shown the stirrup for supporting the reinforcing rods 9, in the form of a plurality of rings or loops 10, suspended from a rod 12, bent into a standard and resting on top of the mold-form 13. In Fig. 22, I have shown a single rectangular loop $10^a$ having the upper part turned over to hook over a supporting bar $12^a$, in lieu of the outwardly extending supporting arms or hooks shown in the other figures.

Instead of forming the stirrups with a single loop, as shown in Figs. 3 to 18, the rod forming the stirrup may be coiled to form a plurality of loops which provide a number of horizontal bars 1ᶜ upon which may be supported the longitudinal reinforcing rods 9 which are thus supported at different levels within the beam or girder. The loops may be rendered more rigid to better support the additional weight of the rods by being tied together at their corners, if desired. These loops may take various forms as I have illustrated in Figs. 23 to 28 inclusive. The vertical members of these loops 15 also constitute shear members to strengthen the beam. The outwardly diverging upper ends 1ᵈ of the stirrups may be variously arranged by being bent at different angles and in different forms to suit different conditions, but in each case being arranged to rest upon the mold forms at the top of the beam or girder in order to support the stirrup and longitudinal reinforcing rods at the proper height or level within the mold form. The construction shown in Fig. 26 in which the outwardly diverging upper ends which form the supporting arms, first engage the corners of the mold and are then bent upwardly and outwardly until the ends bear upon the mold, affords a double support for the stirrups, and also a lateral support to prevent any tendency to shift to one side or the other while the concrete is being poured.

It is sometimes desirable to cross the rods of the stirrup and secure them at the intersection with a wire 15, in the manner shown in Figs. 29 to 32. The stirrup is thereby made rigid and at the same time the resultant downward pull is centered in the mold.

The rods supported by the stirrups may be separated in the mold and held in definite spaced relation by bending the bottom member into a zigzag form, as illustrated in Figs. 30 and 32. In case it is desired to further strengthen a girder or beam against unusual shearing stresses, the stirrups may be bent to form a number of vertically elongated loops, which constitute shear members distributed at regular intervals transversely of the beam.

It will be understood that the stirrups, of whatever form, are distributed at intervals longitudinally of the beam or girder to support the reinforcing rods in the manner illustrated, for instance, in Fig. 10, of my prior application Serial No. 369,765 now Patent 1,240,137.

The stirrups may also support reinforcing rods for the floor slabs. In some cases these may pass through the closed eyes 6, or the open eyes 6ª, when these are suitably located, as in Figs. 5, 9, 13 and 17. In other cases an auxiliary rod 18, may be tied to the arms of the stirrup above the mold, as illustrated in Fig. 32, upon which to support the slab rods 9ª. It will be understood also that rods 18, may be used in connection with the stirrups shown in each of the figures illustrated in the drawings.

I prefer to further reinforce the girders or beams by cantaliver rods of the form shown at 4, in Fig. 1, which extend longitudinally through the beams between the walls for supporting columns which support the floor, the ends of these cantaliver rods resting either upon the end portions of the transverse rods 4, where they extend across the beam molds, as in Fig. 1, or upon rods 12, in Fig. 21, or rods 12ª, in Fig. 22, or rods 18 in Fig. 29. It will be understood of course, that the outwardly extending supporting arms which rest upon the mold in all forms upon either side of the beam, in all of the forms shown in Figs. 21 to 32 inclusive, may be provided with eyes such as illustrated in the preceding figures; also that in all of said figures, two or more stirrups may be formed of a single continuous rod, so as to tie adjacent stirrups together and form intermediate raised connecting members 2, to support transversely extending floor-slab reinforcements, as illustrated in Figs. 1 and 2. And furthermore, that the side members 1, of the stirrups shown in Figs. 23 to 28, may be crossed in the manner shown in Figs. 29 to 32, if occasion arises which makes it desirable, as will be evident to engineers.

The improvements in reinforced concrete construction constituting my present invention, will be appreciated by engineers and architects familiar with concrete buildings and more particularly by those familiar with the stirrups disclosed in my said prior applications and which have gone into extensive use in recent years. I have described in detail the particular constructions illustrated in the accompanying drawings for the purpose of disclosing various embodiments of my invention and the manner of using the same, but it will be evident to engineers that various changes and modifications may be made therein within the scope of my claims and without in any manner departing from my invention.

I claim :—

1. In reinforced concrete construction, supports for reinforcing rods extending longitudinally through the floor beams or girders, comprising stirrups having a loop portion adapted to extend within a moldform and provided with outwardly diverging arms adapted to rest upon the formmold at the side of the beam, and said arms having eyes or loops formed therein to receive connecting rods or reinforcing members.

2. In reinforced concrete construction, supports for reinforcing rods extending longitudinally through the floor beams or girders, comprising stirrups formed of metal rods or strips having a main loop portion adapted to extend within a mold-form and provided with outwardly diverging arms adapted to rest upon the mold-form at the side of the beam, said stirrup being bent into an auxiliary loop at one or more places to form supports for reinforcing members.

3. In reinforced concrete construction, supports for reinforcing rods extending longitudinally through the floor beams or girders, comprising stirrups having a loop portion adapted to extend within a mold-form and provided with outwardly diverging arms adapted to rest upon the form-mold at the side of the beam, and a member connecting the arms of adjacent stirrups.

4. In reinforced concrete construction, supports for reinforcing rods extending longitudinally through the floor beams or girders, comprising stirrups having a loop portion adapted to extend within a mold-form and provided with outwardly diverging arms adapted to rest upon the mold-form at the side of the beam, and a transverse member connecting the arms above the top of the beam or girder.

In testimony whereof I affix my signature in the presence of two witnesses.

RUDOLPH B. HARTMAN.

Witnesses:
A. J. HARVEY,
G. F. RUSSELL.